(12) United States Patent
Zanon et al.

(10) Patent No.: US 11,024,919 B2
(45) Date of Patent: Jun. 1, 2021

(54) BATTERY PACK WITH SECURE-LOCKING MECHANISM AND SHOCK ABSORBING SYSTEM WITH EASY INSERTION MODE

(71) Applicant: Datalogic IP Tech S.r.l., Lippo di Calderara di Reno (IT)

(72) Inventors: Paolo Zanon, Modena (IT); Mauro Pecorari, Porto Potenza Picena (IT); Paolo Quattrini, Sala Bolognese (IT)

(73) Assignee: DATALOGIC IP TECH S.R.L., Lippo di Calderara (IT)

( * ) Notice: Subject to any disclaimer, the term of this patent is extended or adjusted under 35 U.S.C. 154(b) by 138 days.

(21) Appl. No.: 16/231,570

(22) Filed: Dec. 23, 2018

(65) Prior Publication Data

US 2019/0198828 A1  Jun. 27, 2019

Related U.S. Application Data

(60) Provisional application No. 62/609,795, filed on Dec. 22, 2017.

(51) Int. Cl.
*H01M 50/213* (2021.01)
*H01M 50/24* (2021.01)

(52) U.S. Cl.
CPC ......... *H01M 50/213* (2021.01); *H01M 50/24* (2021.01); *H01M 2220/30* (2013.01)

(58) Field of Classification Search
CPC ...... H01M 2/105; H01M 2/10; H01M 2/1016; H01M 2/1094; H01M 2220/30
USPC .......................................................... 429/99
See application file for complete search history.

(56) References Cited

U.S. PATENT DOCUMENTS

| | | | |
|---|---|---|---|
| 5,401,592 A | 3/1995 | Gilpin et al. | |
| 8,741,461 B2 | 6/2014 | Yoneda et al. | |
| 9,236,588 B2 | 1/2016 | Hanawa et al. | |
| 9,504,172 B2 * | 11/2016 | Raschilla | H05K 5/0008 |
| 2010/0209752 A1 * | 8/2010 | Lerner | H01M 2/1055 429/97 |
| 2011/0135975 A1 * | 6/2011 | Fuhr | H01M 2/08 429/53 |
| 2012/0326665 A1 * | 12/2012 | Yin | B60L 50/53 320/109 |
| 2013/0136958 A1 * | 5/2013 | Chuang | H01M 2/20 429/53 |

* cited by examiner

*Primary Examiner* — Gary D Harris
(74) *Attorney, Agent, or Firm* — Shook, Hardy & Bacon, L.L.P.

(57) ABSTRACT

An improved battery pack is inserted in a handle portion of a handheld scanner. The battery pack has an integral shock absorbing system where the structure surrounding the battery cell provides advantageous shock protection. The improved battery pack has a locking and unlock mechanism for retention of the battery pack. The locking and unlock mechanism retains the battery pack in the handheld scanner in the event of a shock or impact.

20 Claims, 13 Drawing Sheets

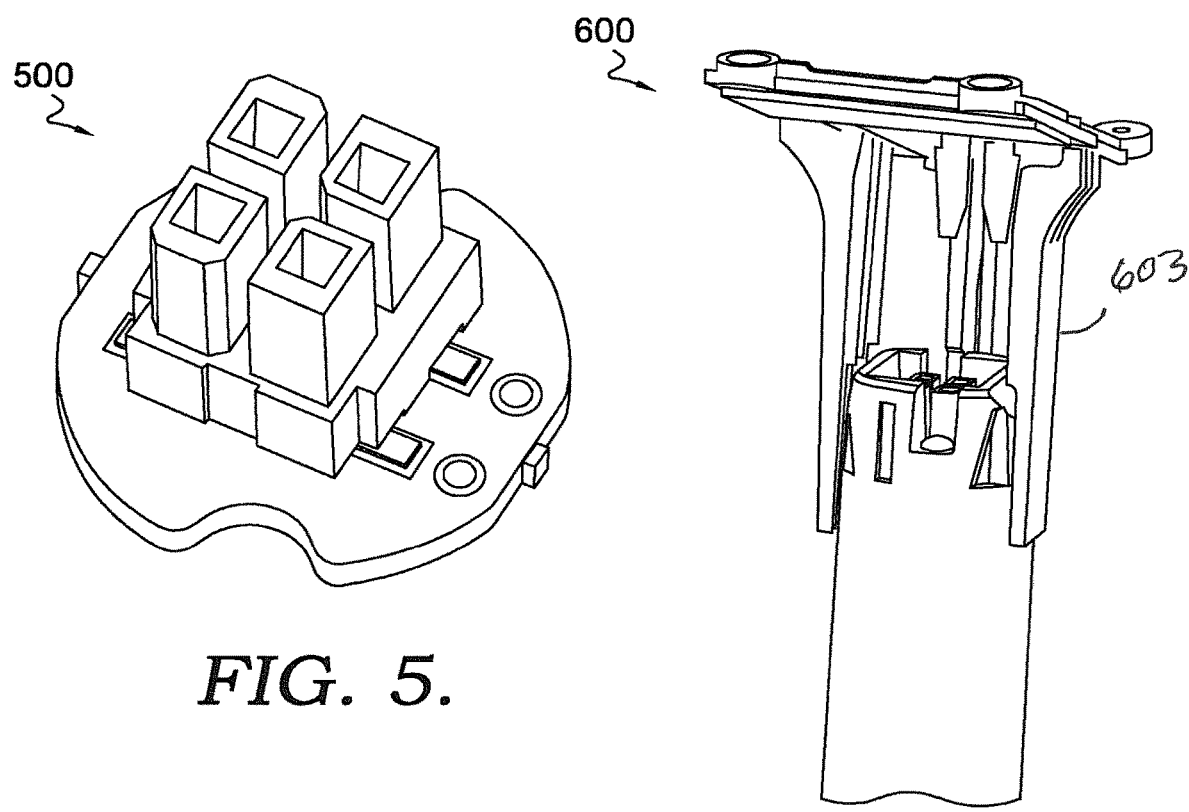
FIG. 5.
FIG. 6.
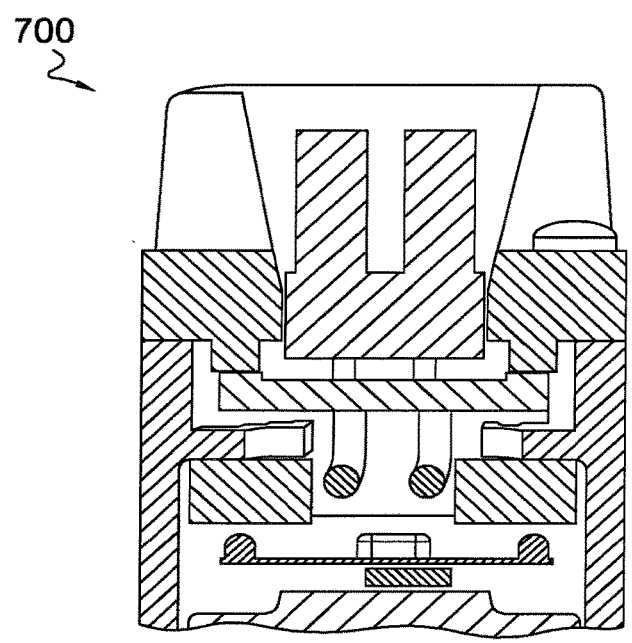
FIG. 7.

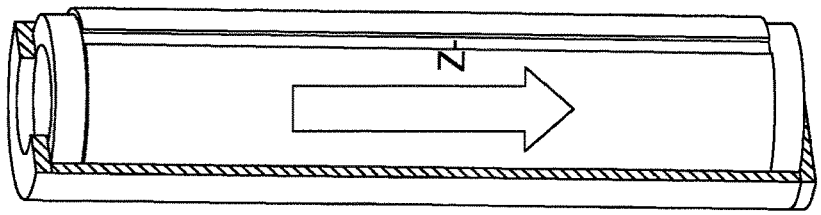
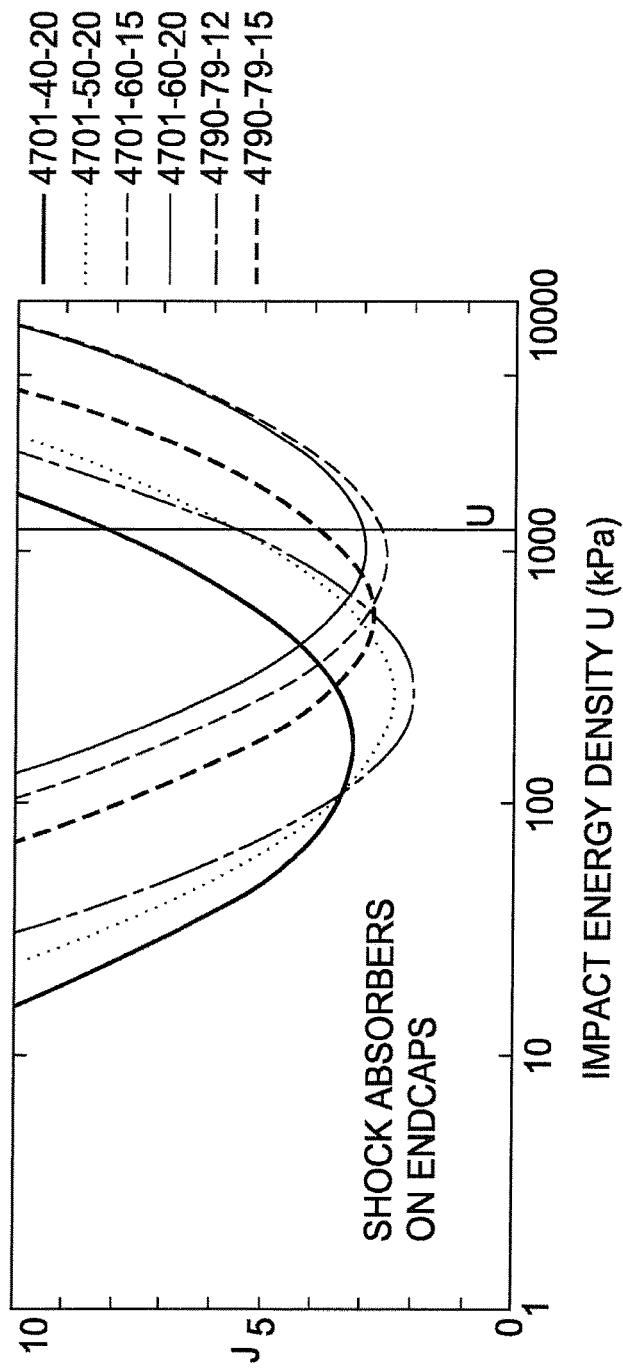
FIG. 16.

SHOCKS ABSORPTIONS IN X-Y DIRECTION
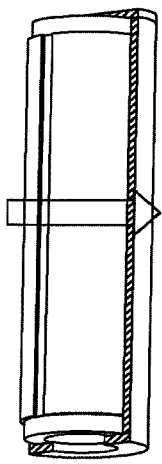
- VELOCITY AT IMPACT: 7 M/S (DROP HEIGHT H = 2.5M)
- MEASURED TIME OF IMPACT: 0.2-0.4 MS
- CELL WEIGHT: 0,045 KG
- DROP HEIGHT: 2,5 M (2.00 M)
- IMPACT ENERGY: 1,10 J (0.89 J)
- ENERGY DENSITY U = 1223KPA
- ENCLOSURE Φ19MM; L= 69 MM
- ALLOWED THICKNESS OF ABSORBER 0.1...0.3 MM
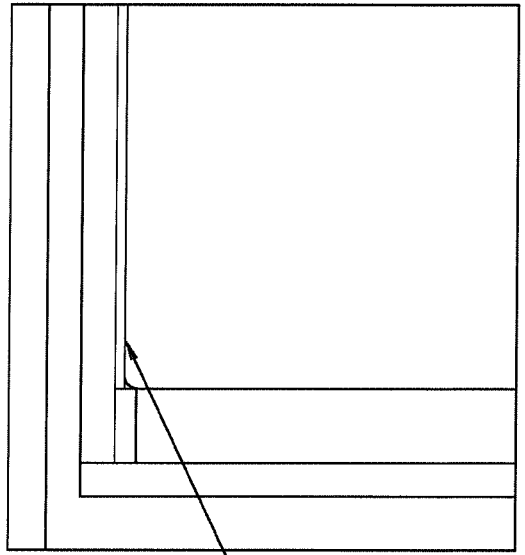
PORON SHOCKPAD?
OTHER?
*FIG. 17.*

BATTERY PACK WITH SECURE-LOCKING MECHANISM AND SHOCK ABSORBING SYSTEM WITH EASY INSERTION MODE

CROSS-REFERENCE TO RELATED APPLICATIONS

This application claims the benefit of U.S. Provisional Application No. 62/609,795, filed Dec. 22, 2017, the entirety of which is hereby incorporated by reference.

BACKGROUND OF THE INVENTION

Generally speaking a battery pack is a sort of "bullet" that it is inserted inside a gun, and then closed by an appropriate cap to prevent the extraction from the gun. When enclosed by the cap, the enclosure has a certain level of ingress protection (IP). In a current batter pack, the cell enclosure and the cap are integrated into one unique body that creates a condition to assure the IP rating of the whole gun. Therefore, the battery pack has an implicit function to assure IP.

The current state of the art is the following: All battery packs are welded by ultrasonic technology. The mechanism to lock and unlock the battery pack is typically in plastic or aluminum. The mechanism is constructed of a single lock (e.g. clamp, screw). The IP is assured by a separate cap. There is no shock absorbing system, neither inside the "survival enclosure," nor outside the battery pack. Enclosures are customized on precise dimensions of the cell. Current battery packs guarantee IP rating by a potting of Terostat to close all gaps due to incorrect welding.

The current battery pack has a mechanism constituted by two (2) sliders and a low efficiency due to friction loss. The current battery pack has a lower precision due to a gap that 9076773 vl must be closed with a welding mechanism. This gap also allows the hook to slide inside the rails.

A new and/or improved shock absorbing system and locking mechanism is needed to overcome the deficiencies of current battery packs.

BRIEF SUMMARY OF THE INVENTION

An improved shock absorbing system and locking mechanism for a battery pack is provided for a handheld device. The shock absorbing system and locking mechanism for the battery pack avoids ultrasonic welding, improves mechanical robustness, replaces obsolete battery cells, improves manufacturability, provide better protection of the battery cells during drop tests, has better coupling on the connector of the handle board, has an improved shape to determine the area of collision during drop tests, has an air bumper in the front of the foot, has an improved standard locking mechanism, and has a secure-locking device.

The use of the improved shocking absorbing system and locking mechanism results in a reduction of failures in the field thanks to the shock absorbing system; cost reduction in production due to the lack of ultrasonic welding; "green" battery pack without glue and Terostat by Henkel Corporation of Dusseldorf, Germany; a new safety-locking mechanism introduced to address customer complaints, the upper cap reduces damage of the connectors, reducing the failure rates in the field; a customer-oriented experience because the feel of the button can be customized without interfering with the function; and re-workable device.

In a first aspect, a method for creating a battery pack with a shock absorbing system for damping a force is provided that includes encasing a battery cell in a shock absorbing material. The shock absorbing material has a cylindrical portion that surrounds the battery cell and functions as a first shock absorber, a bottom portion that covers an end of the battery cell and functions as a second shock absorber, and a top portion that covers substantially a top of the battery cell and functions as a third shock absorber. The cylindrical portion, the bottom portion, and the top portion are placed together. The shock absorbing material is positioned inside a plastic enclosure with a cap. Use of ultrasonic welding is avoided during a creation of the battery pack.

In another aspect, a battery pack with a shock absorbing system for damping a force is provided that includes the following. A battery cell and a cell gauge printed circuit board are connected together. The battery cell and the cell gauge printed circuit board are located in a shock absorbing material. The shock absorbing material has a cylindrical portion encircling a cylindrical part of the battery cell, a bottom portion that covers a bottom end of the battery cell, and a top portion that covers substantially a top end of the battery cell, and an enclosing portion that surrounds the cell gauge printed circuit board. The cylindrical portion functions as a first shock absorber. The bottom portion functions as a second shock absorber. The top portion functions as a third shock absorber. The enclosing portion has a sub-piece that functions as a fourth shock absorber. The cylindrical portion, the bottom portion, the top portion, and the enclosing portion are placed together. The shock absorbing material is positioned inside a plastic enclosure with a cap. The plastic enclosure is constructed of a single uniform piece of material having no ultrasonic welding.

In yet another aspect, a locking and unlocking mechanism for a battery pack in a handheld scanner is provided that includes bushes that position a hook inside a shell. The hook rotates around a hinged axis. A button is fleeting mounted on the hook. The button and the hook are coupled together and allow a rotation of the hook and a translational motion of the button. The translational motion of the button means the button moves with a trajectory in a line and does not rotate. When the battery pack is inserted into the handheld scanner, the hook rotates and locks the battery pack in a position, and the button moves in the translation motion to extend beyond the shell. When the battery pack is removed from the handheld scanner, the hook rotates and unlocks the battery pack from the position, and the button moves in the translation motion to retreat into the shell.

BRIEF DESCRIPTION OF THE SEVERAL VIEWS OF THE DRAWING

FIGS. 5, 6, and 7 illustrate various views of the connector board of the battery pack, implemented in an embodiment of the invention;

FIG. 16 illustrates exemplary test results from a z-direction impact of a battery cell, implemented in an embodiment of the invention; and FIG. 17 illustrates exemplary test results from a x-y-direction impact of a battery cell, implemented in an embodiment of the invention.

DETAILED DESCRIPTION OF THE INVENTION

Figure 1:
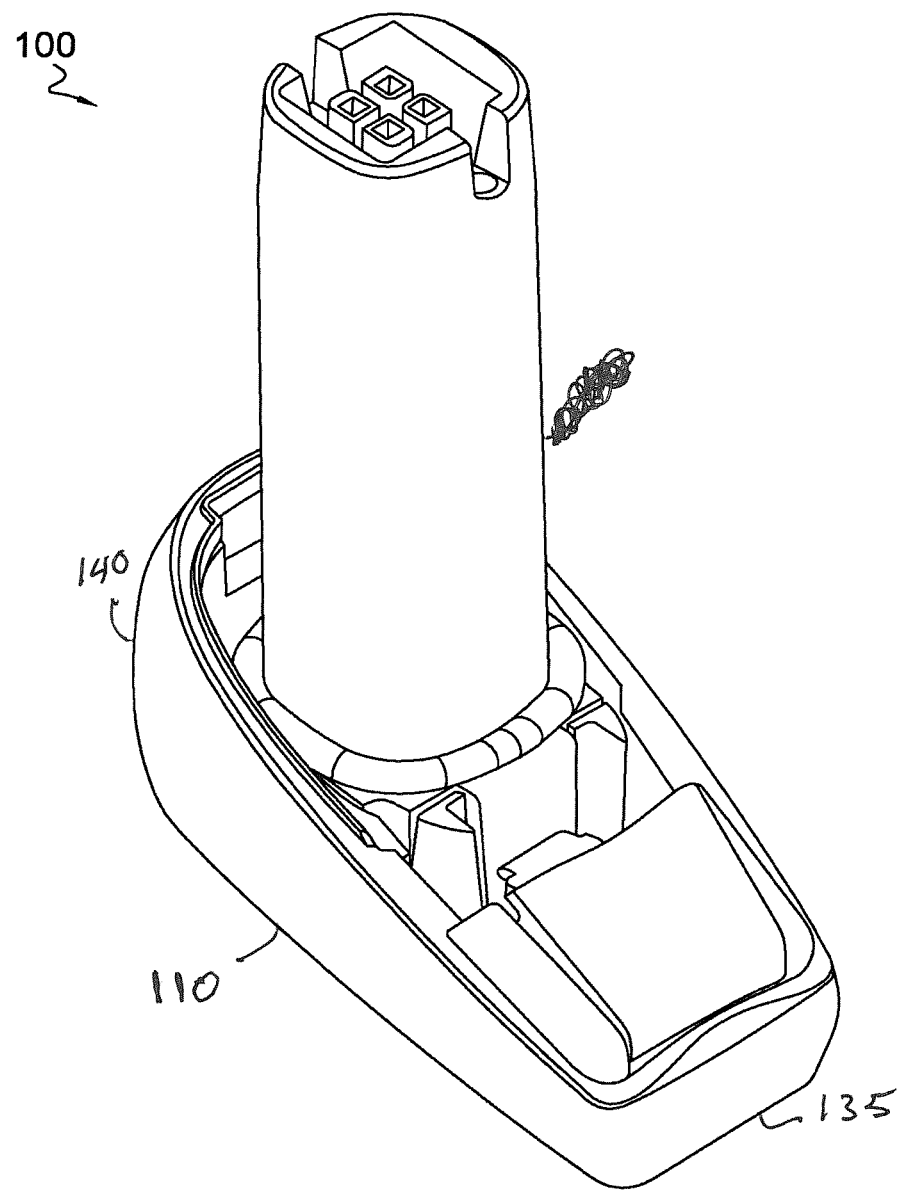
FIG. 1 illustrates an exemplary battery pack, implemented in an embodiment of the invention.

Embodiments of the invention include a battery pack 100 as shown in FIG. 1 that prevents damage and malfunctions to the Li-ion cell (i.e. battery cell). The battery pack 100 includes a fast release system that is part of an innovative system to lock and unlock (205) the battery pack in and from the device. The aim of the disclosure is to provide a more safe and user-friendly battery pack that can be used and changed very quickly, avoiding any leakage. Moreover, the Li-ion cell is protected with a 6-axis damping solution.

Figure 2:
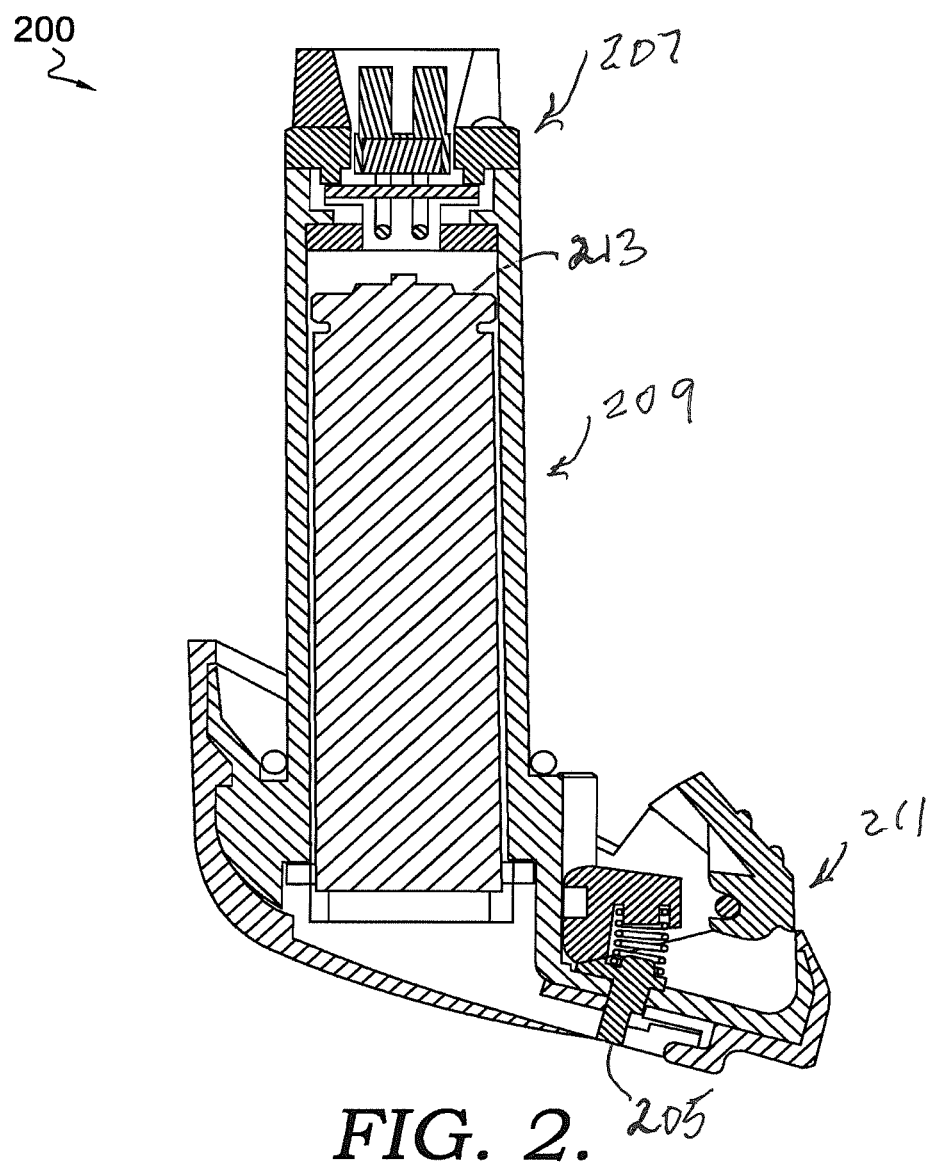
FIG. 2 illustrates a cross-sectional view of a battery pack schematic, implemented in an embodiment of the invention.

Turning now to FIG. 2, a cross-sectional view 200 of battery pack 100 is shown having three sections: A connection area 207; a cell box 209 that contains a battery cell 213; and a release mechanism 211 with lock/unlock system 205.

Embodiments of the invention are related to an innovative battery pack for an industrial handheld scanner, with a double system of locking: Standard locking of the battery pack inside the handle component; and secure locking to prevent accidental extraction of the battery pack due to floor drops or abnormal usage by the operator.

Embodiments of the invention include a battery pack for industrial optical code readers. For example, optical code readers include camera devices that may in turn comprise an array of optical detectors and a uniform light source, such as a light emitting diode (LED), used to illuminate a surface. The optical detectors may be charge-coupled devices (CCDs), complementary metal-oxide semiconductor (CMOS) devices, or other suitable devices, and they may be implemented in a one-dimensional or two-dimensional array. In operation, when light from the light source reflects from the surface or from the surface of an object, the array detects the reflected light to capture an image. Systems with one-dimensional arrays capture sequential linear cross-sections that collect to form a two-dimensional image, whereas two-dimensional arrays repeatedly capture two-dimensional images that change incrementally as the object moves past the camera.

The new battery pack 100 has a shape similar to the current battery pack, but with many improvements that can are listed below. The battery pack has an integrated closing cap, capable to assure the impact protection of the handle component. Generally, the battery pack is akin to a "bullet" that it is inserted inside a gun and then closed by an appropriate cap to prevent the extraction from the gun. The enclosure meets certain ingress protection.

Figure 3:
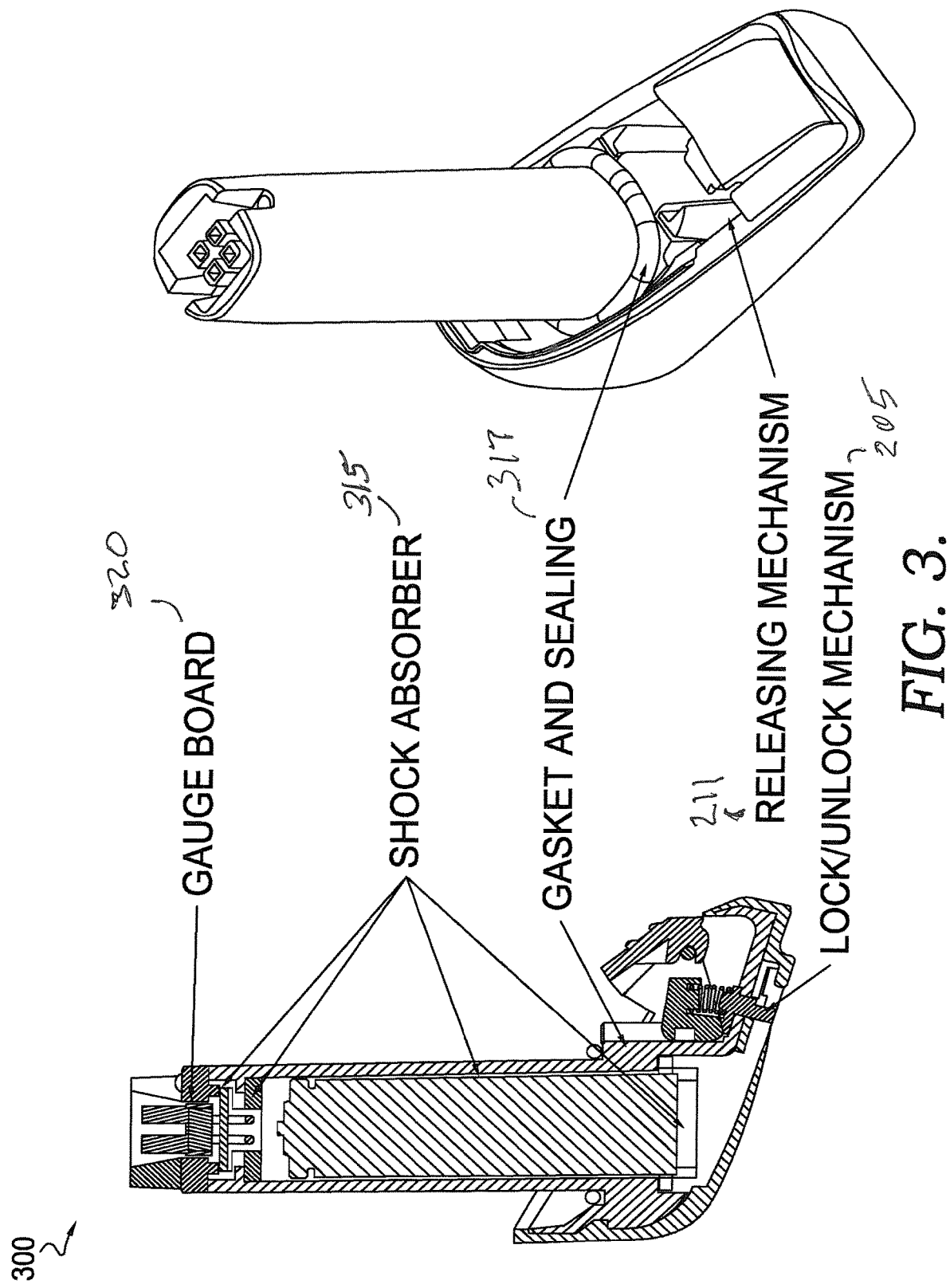
FIG. 3 illustrates a joint view of a battery pack and a cross-sectional schematic of the battery pack, implemented in an embodiment of the invention.

In FIG. 3, a joint view 300 of battery pack 100 and cross-sectional view 200 is shown with gauge 320, shock absorbers 315, gasket and seal 317, releasing mechanism 211, and lock/unlock mechanism 205. Gasket and seal 317 perform ingress protection. Battery pack 100 can connect to a variety of models. Shock absorbers 315 provide for a 6-axis cell damping. Releasing mechanism 211 allows for fast release by the translation button with self-lock mechanism. The lock/unlock mechanism 205 allows for easy locking and unlocking.

Figure 4:
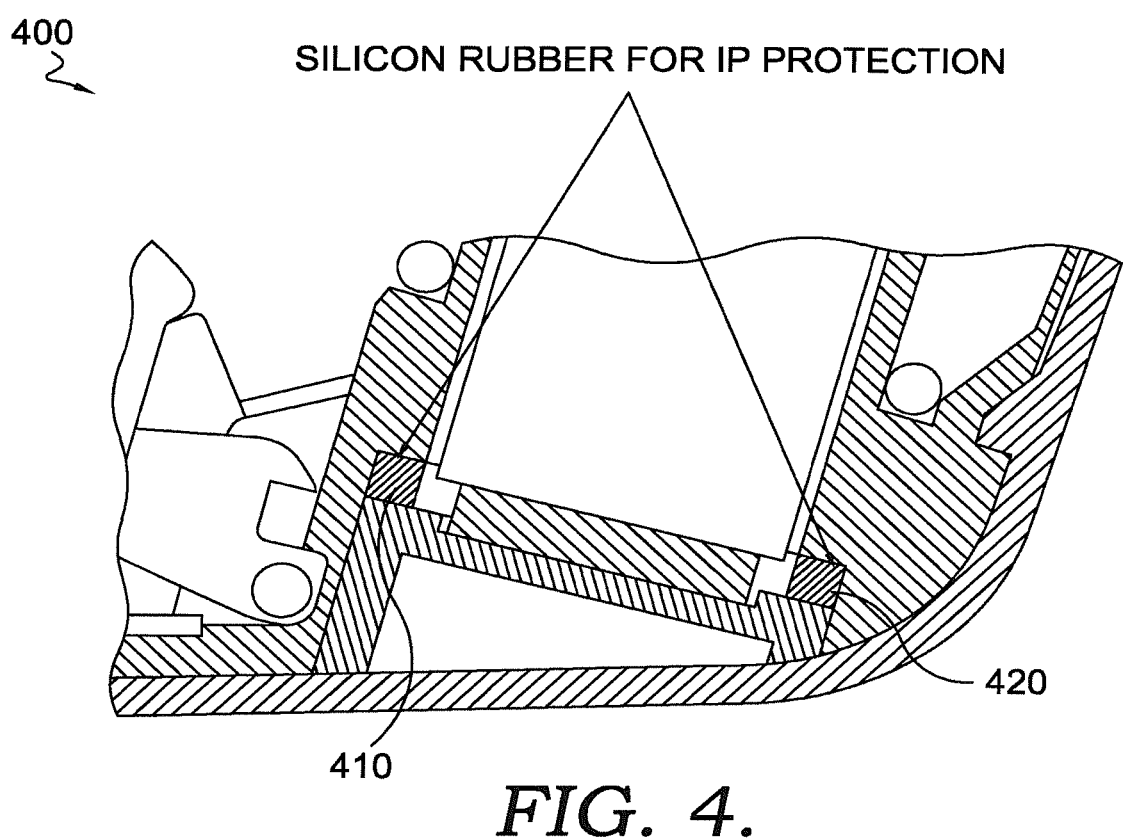
FIG. 4 illustrates a bottom cross-section view of battery pack schematic, implemented in an embodiment of the invention.

In FIG. 4, a bottom cross-sectional view 400 of battery pack 100 is shown to highlight the use of gaskets 410 and 420. In some embodiments, there may be an inner gasket and an outer gasket for ingress protection. In various embodiments, gaskets 410 and 420 may be made of silicon rubber for ingress protection.

The battery pack 100 has new improvements, such as the following:

1. Avoids Ultrasonic Welding:

The body 110 hosts the battery cell 213 and has one locking mechanism 205. This arrangement helps maintain tight tolerances, robustness, and an easier way of mounting. The body 110 also has uniform and glass polished surfaces where it needs ingress protection. The body 110 is created so that it does not have any kind of parting line or ultrasonic welding gaps that would cause water or dust to enter inside the gun. Furthermore, it is more reliable to insert shock absorbers 315 all around the battery cell to create a sort of "survival cell" of the soft pack.

2. Improves Mechanical Robustness:

The unique body creates a more robust structure due to the continuity of the material. Moreover, all the mechanism features (sliders and retaining teeth for bushings and mechanisms) can be built from the same part of the mold, maintaining more precise dimensions.

3. Replaces the Obsolete Battery Cell:

This battery pack is more fault tolerant over older models, enabling it to better protect electronics board and prevent damages.

4. Improves Manufacturability:

The batter pack uses no glue and no ultrasonic welding. It only uses screws (all of the same type) and clamps. The gauge 320 (i.e. cell gauge printed circuit board) is welded after the insertion of the battery cell and the wires. Also, the gauge 320 has a predetermined volume where to be set after mounting.

5. Better Protection of the Cells During Drop Tests.

A "survival enclosure" has been created for the battery pack, where the interior area or battery cell 213 is located with appropriate shock absorbers 315 that are provided to reduce the shock to about one half the impact acceleration. Additionally, the battery pack is encased with shock absorbing material, such as an elastomeric material 1525 like PORON manufactured by Rogers Corporation of Chandler, Ariz.

In embodiments, the battery pack 100 is designed to protect the lithium-ion (Li-ion) battery cell from damage due to impact. In details, battery pack 100 is equipped with four (4) shock absorbers 315. In other embodiments, there can be more shock absorbers than four. The upper shock absorber as shown in FIG. 3 has the function to protect the cell gauge PCB from impact and absorbs mounting tolerances. The shock absorber around the battery cell protects the battery cell from lateral impact. The top and bottom shock absorbers at the end of the battery cell (second from the top and last at the bottom) are typically thicker and protect the battery cell from the main impact direction.

Turning now to FIGS. 5, 6, and 7, a connector 500 is shown that located above the battery cell 213. In some embodiments, connector 500 is part of gauge 320. An upper part 603 is shown in a coupling illustration where upper part 603 engages with battery pack 100. Upper part 603 is created to ensure a correct connection to various product models including, but not limited to, handheld scanning devices, mobile computers, etc. Upper part 603 is a cap and aligns to connector 500. The printed circuit board (pcb) is "free to align" based on connector 500's position. During insertion, as shown in FIG. 6, upper 603 is guided by a funnel-shaped part to reach the right position. In FIG. 7, an enlarged illustration of connection area 207 is shown.

6. Better Coupling on the Connector of the Handle Board:

The cap has a well defined shape to allow the battery pack to reach the connector and: 1) Assure a connection "always" exists (it fails less than 1 part out of 1,000,000); and 2) Assure there is no damage the connector even when the battery pack is inserted with unknown forces. The shape of the battery pack allows for a precise insertion with or without a new element being added. The battery pack has a "funnel shape." In fact, this improvement is compatible with existing handheld scanners and with new handheld scanners that have the "funnel shape."

7. Better insertion between the handle tooth and the foot, thanks to precise guides made with a low-friction material that allows the battery rotating hook 940 to be more precise in retaining the battery on the handle.

8. Improved Shape to Determine the Area of Collision During Drop Tests:

The front region 135 and the rear region 140 of the battery pack have thicker plastic. The regions have been developed to assure a handling of an impact on a predefined surface.

Figure 8:
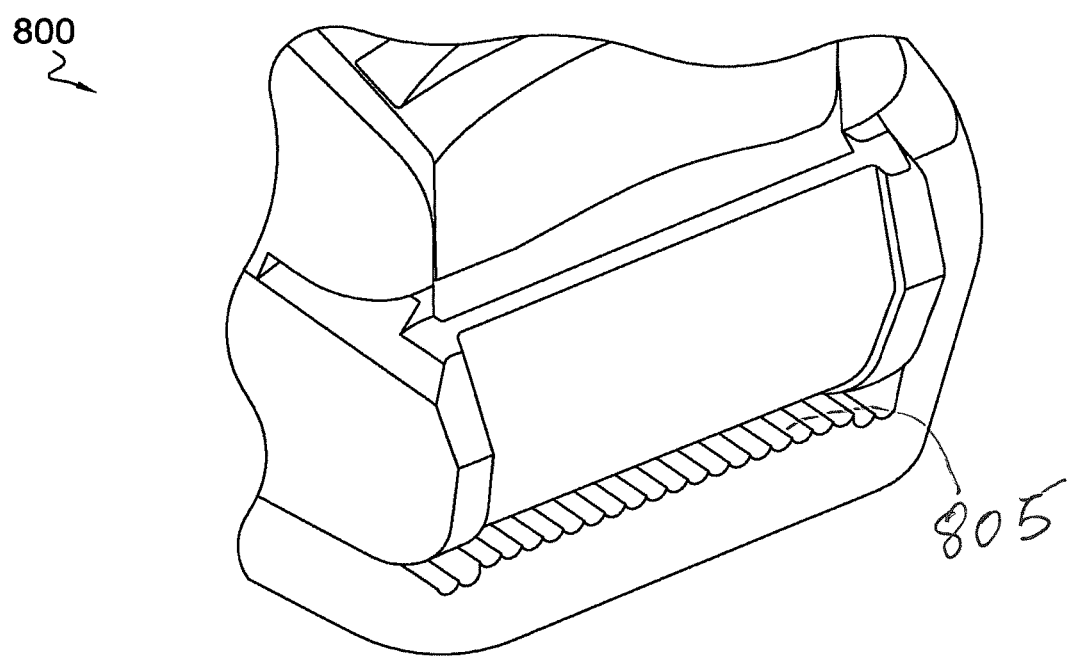
FIG. 8 illustrates an air bumping system in the boot area of a battery pack, implemented in an embodiment of the invention.

9. Air Bumper in the Front of the Foot:

Turning now to FIG. 8, an air bumping system 800 is shown in a partial view of the boot area of battery pack 100. The boot and the plastic are not in adhesion in the front of the corner, but it has a pattern 805 of air chambers and separated thin ribs, which are able to collapse to absorb the shock if the battery cell hits on that corner.

Figure 9A:
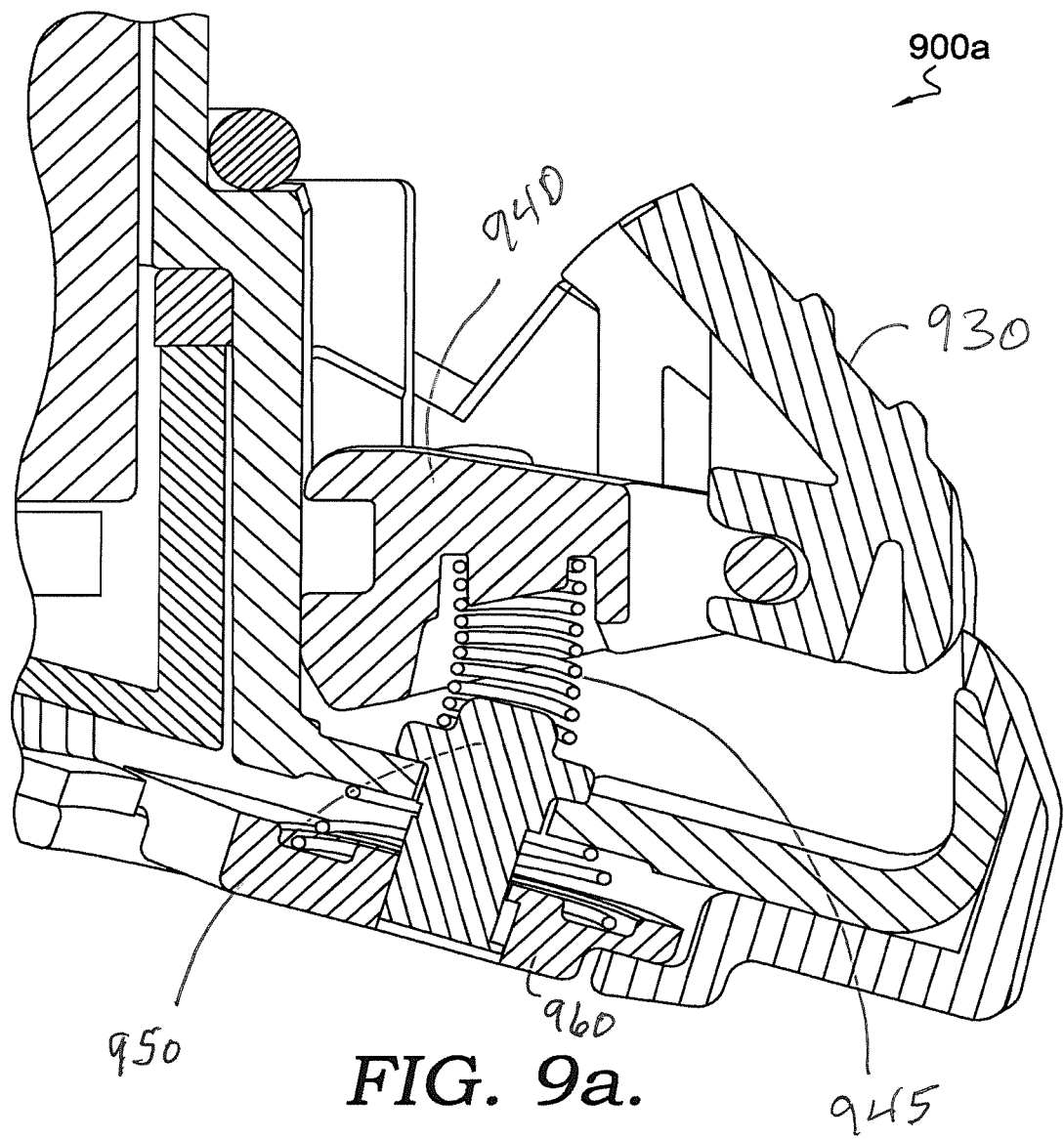
FIGS. 9a, 10, and 11 illustrate cross-sectional views of a boot in a battery pack, implemented in an embodiment of the invention.
Figure 10:
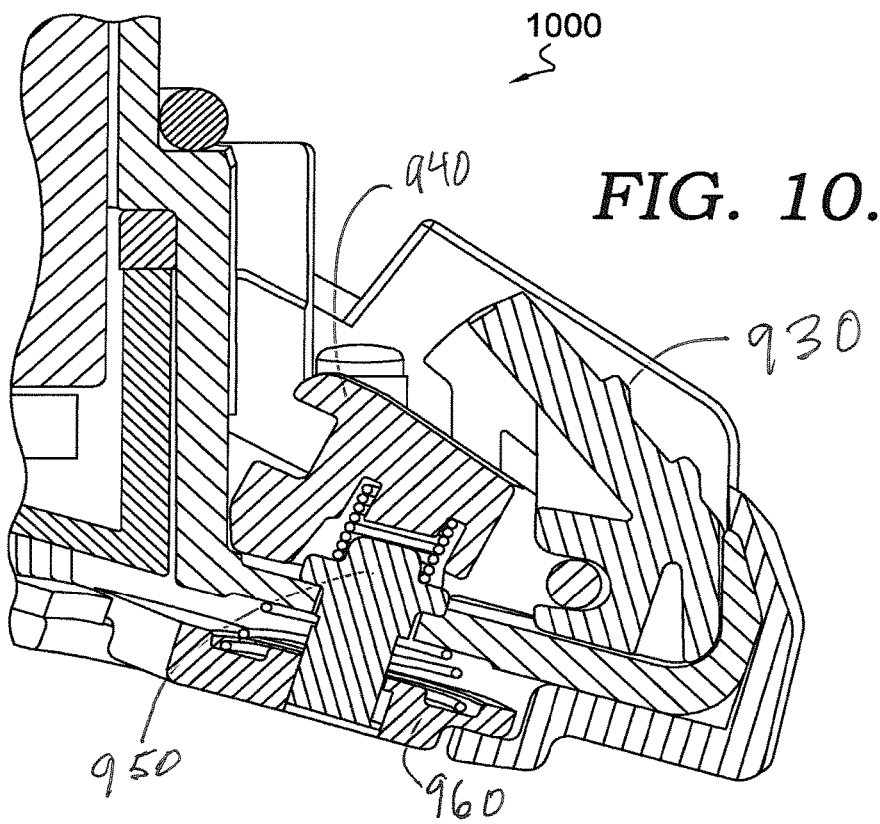
Figure 11:
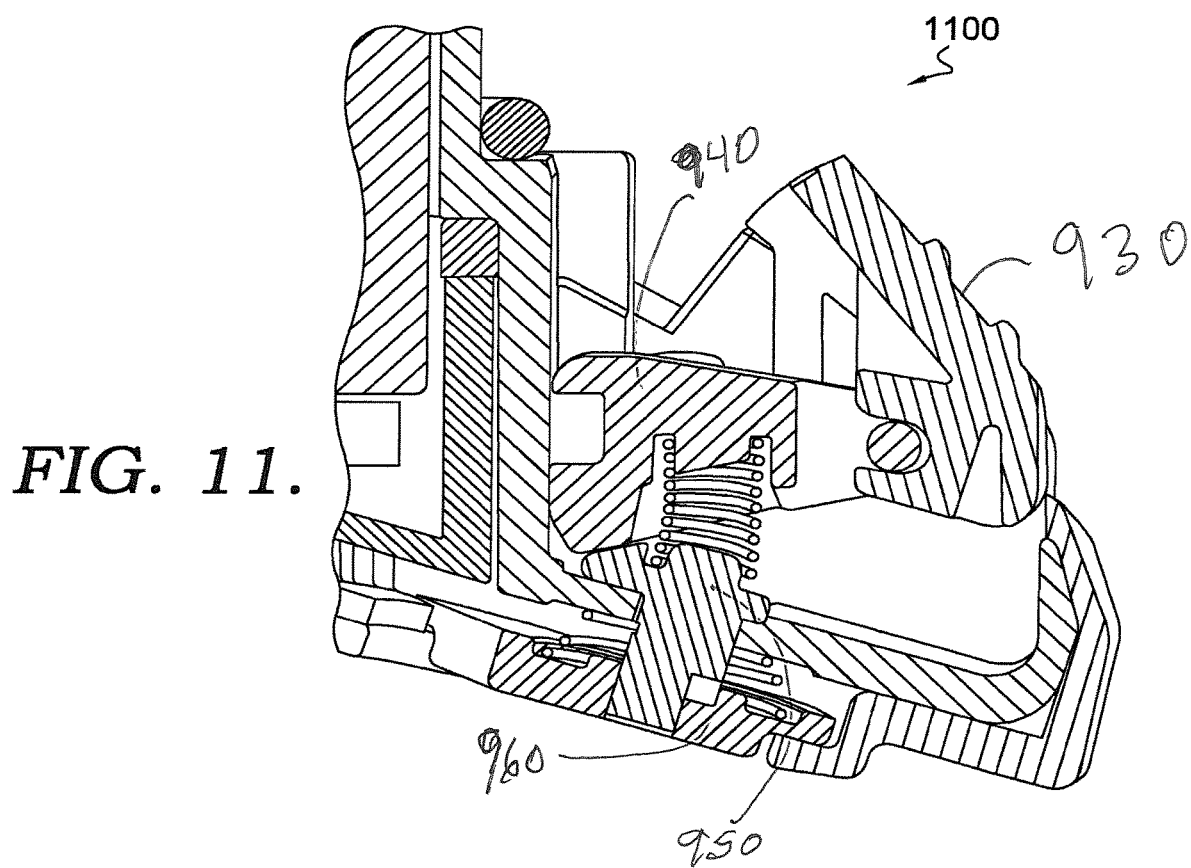

10. Improved Standard Locking Mechanism:

In FIGS. 9a, 10, and 11, the boot 900a, 1000, and 1100 are shown with the rotating hook 940, button 930, and spring 945 in various open and closed positions.

The mechanism to fix and remove battery pack 100 inside a scanner is made as follows. The bushes assure the position of the hook 940 inside the shell. The hook 940 can only rotate around its hinge axis. The button 930 is fleeting mounted on the hook 940. This coupling allows the rotation of hook 940 and the translation of the button 930. The button 930's trajectory is a line. The button 930 does not rotate, which allows an improvement to a user feeling. The rotation of hook 940 ensures a self-locking system, which is related to the position of hook 940 in relation to the hinge axis. The return to the rest position is assured by spring 945.

To avoid battery pack 100 release during a shock or impact, a lock/unlock system 205 is provided. The lock/unlock system 205 works with a chock 950 that can be rotated and inserted between hook 940 and the shell. Chock 950 does not allow the rotation of hook 940. To simplify the rotation of chock 950, an actuator 960 is introduced below the shell. To avoid undesired rotations of chock 950, spring 945 pushes actuator 960 towards the boot in a resting position. To enable rotation of chock 950, it is necessary to push actuator 960 and rotate it. The mounting of chock 950 and actuator 960 is done in a position and no longer reachable after mounting the boot. This coupling ensures against undesired decoupling.

FIG. 9a illustrates the locking/unlocking mechanism 205 and releasing mechanism 211 in an unlocked position with button 930 in a resting position. FIG. 10 illustrates the locking/unlocking mechanism 211 in an unlocked position with button 930 depressed or in an active position. As one can see, button 930 appears to have been pressed. FIG. 11 illustrates locking/unlocking mechanism 205 and releasing mechanism 211 in a locked position where button 930 has been pressed or placed in the active position and then rotated up so that the hook touches the back wall similar to its position in FIG. 9a. Although FIGS. 11 and 9a appear similar, in some embodiments, FIG. 11 may show button 930 pushed down into the boot more and then rotated to lock the position of hook 940.

a. The battery pack has a new mechanism constituted by 2 pins and a slider, with spring 945 to allow the button to restore the normal configuration. The advantages are:

b. The pins are more precise, and the locking is assured for statistical purposes for large productions.

c. The feeling by the operator is independent from the frictions. but only to the spring stiffness that can be tuned according to marketing requirements.

d. The stroke of the button is wider, giving a better feeling.

e. If the battery pack is not well engaged, the button remains in an abnormal position and the operator is alerted to insert the battery pack properly.

11. New Secure-Locking Device

This device has a double function:

a. One function is to avoid pressing accidentally the button during the gun (handheld scanner) usage, by the operator to disengage the battery cell.

b. Another function is to avoid the battery disengaging from the scanner during floor drops.

It is important that the locking and unlocking mechanism does not move by itself during abnormal usage and during drops. Therefore, a special shape has been created to prevent its movement during an impact on the floor and a disassembly due to accidental shocks.

The principle of the unlocking and locking mechanism is that to be moved it is necessary to do two (2) operations in two (2) different axis of directions. A press and rotation are provided to enable the battery pack to stay secure in the scanner. This prevents unlocking (or dissassembling) due to an accidental force that has (by definition) only one (1) direction of movement.

The locking and unlocking mechanism has an assembly, free of screws and glue. The locking and unlocking mechanism also has a special shape that allows the operator to mount it without keeping it tight or pre-assembled using the fingers. Furthermore, the assembling inside the unibody is possible with only one hole, so that the body remains stiff and robust.

Figure 12:
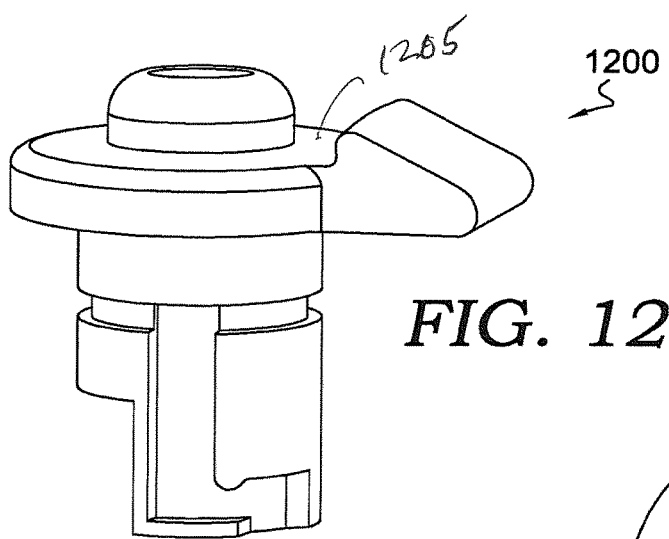
FIG. 12 illustrates an exemplary pin with a protruding chock, implemented in an embodiment of the invention.
Figure 13A:
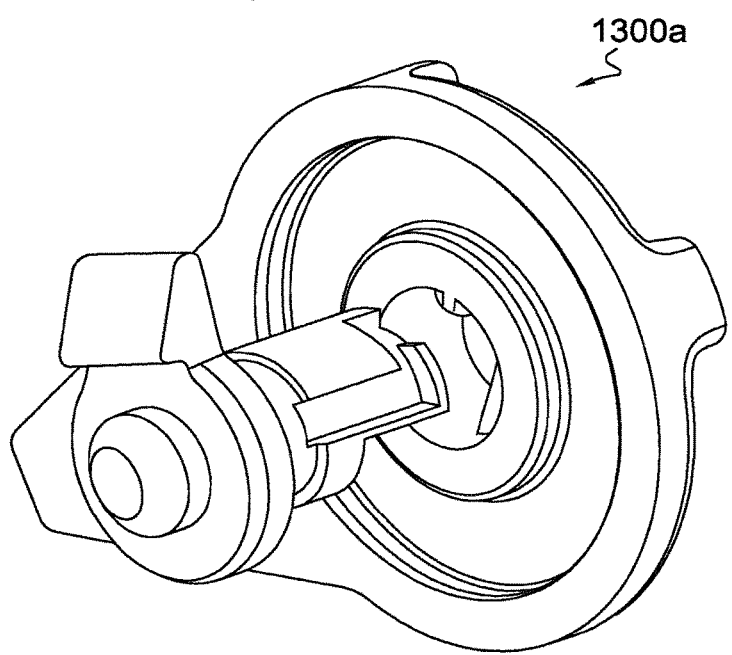
FIGS. 13a and 14a illustrate a locking actuator and pin, implemented in an embodiment of the invention.
Figure 13B:
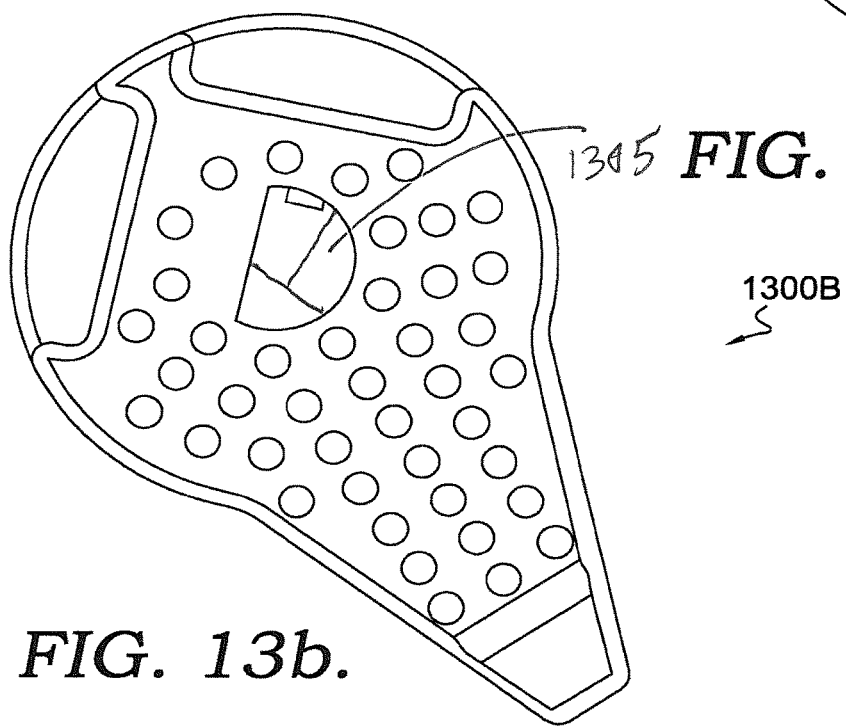
FIGS. 13b and 14b illustrate exemplary bottom side of a actuator, implemented in an embodiment of the invention.
Figure 14A:
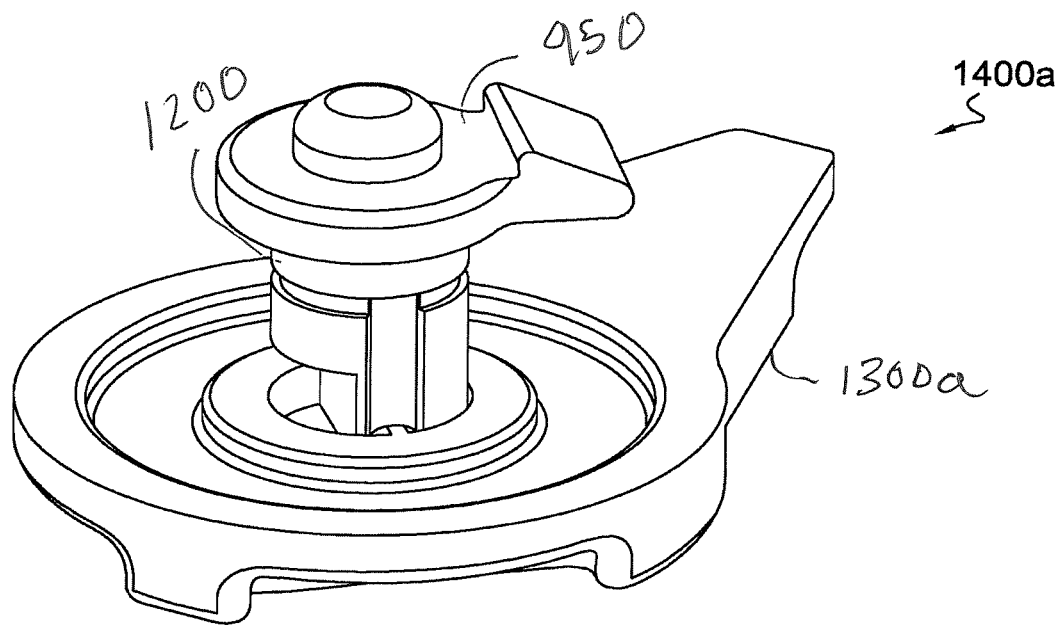
Figure 14B:
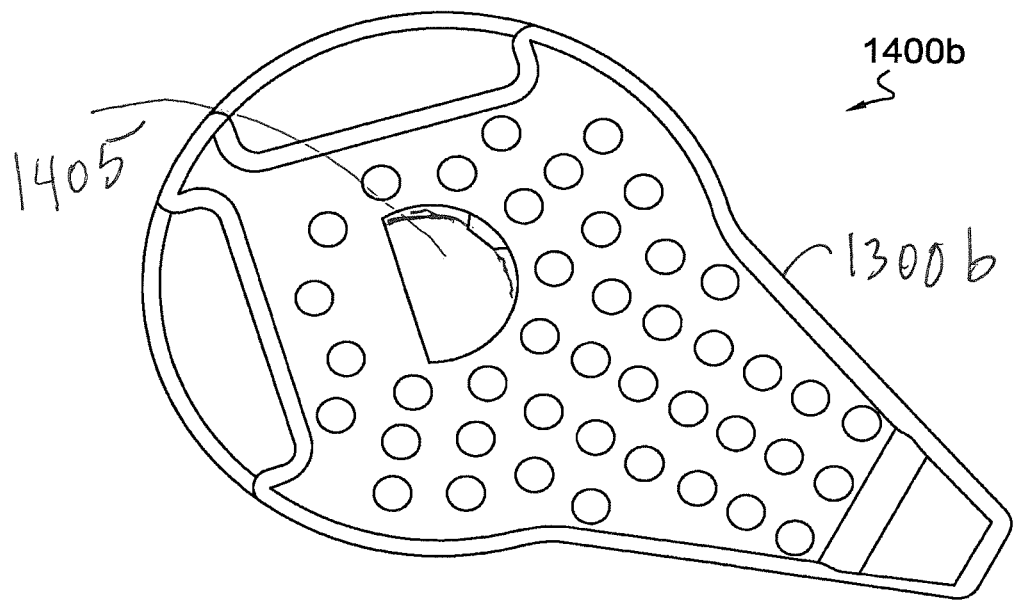

In FIG. 12, pin 1200 is shown with a sliding guide. Chock 1205, which is similar to chock 950, can be seen. In FIG. 13a, actuator 1300a is shown with pin 1200. Actuator 1300a is inserted at pin 1200. Their positions can be matched for the insertion to occur at the coupling of their odd shapes. After insertion, actuator 1300a can be rotated about pin 1200 with chock 1205. In FIG. 13b, a bottom side 1300b of actuator 1300a is shown. Pin 1200 and actuator 1300a are engaged together and allow for a substantially flat surface when the two are together. Area 1305 is the point where pin 1200 engages to be connected to actuator 1300a. FIG. 14a provides another illustration of actuator 1300a engaged with pin 1200 and chock 950. FIG. 14*b* is a view of bottom side 1300*b* where pin 1200 has not quite engaged actuator 1300*a* completely in area 1405.

Figure 15:
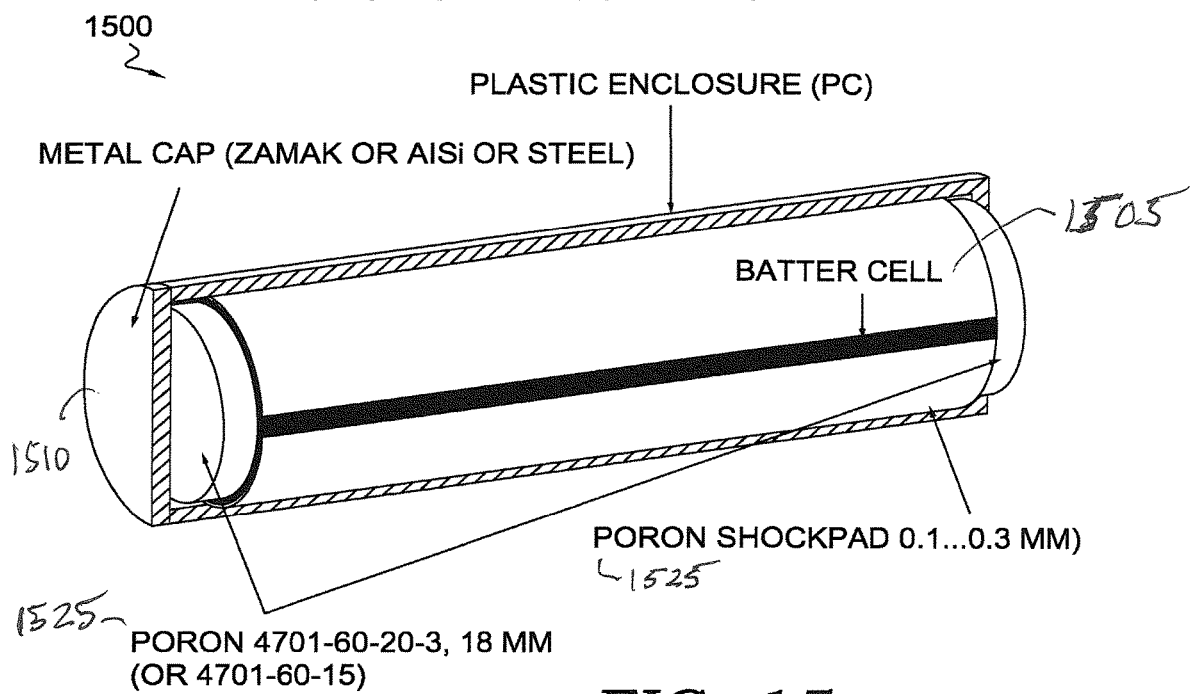
FIG. 15 illustrates an exemplary battery cell encased in shock absorbing material, implemented in an embodiment of the invention.

Turning now to FIG. 15, a battery system 1500 is shown with a battery cell 1505 covered in elastomeric material 1525 like PORON. Battery cell 1505 and elastomeric material 1525 are further encased in a cap 1510. In embodiments, battery system 1500 is designed this way to handle shock. In other words, elastomeric material 1525 acts as an absorbing material.

In FIG. 16, an exemplary illustration 1600 shows statistics of a battery encountering shocks in a Z-direction. In X-Y-Z axes, the Z-direction is perpendicular to the X and Y planar directions. As shown, Z-direction indicates a downward motion or drop. The impact of a drop is shown as to the impact energy density. Although FIG. 16 is exemplary for drop height of 2.5 meters, other statistics can be created that show the tolerances of a battery dropped from varying heights and encased in other materials. Such statistics allow a developer to create a battery system which can tolerate certain impacts.

Turning now to FIG. 17, an exemplary illustration 1700 shows statistics of a battery encountering shocks in an X-Y direction. As shown in FIG. 16, FIG. 17 illustrates the tolerances that a batter can take when encased in PORON or other material. Also, the statistic can change in other embodiments using different drop heights.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned invention can be completed without departing from the scope of the claims below. Certain features and sub-combinations are of utility and may be employed without reference to other features and sub-combinations and are contemplated within the scope of the claims.

Having thus described the invention, what is claimed is:

1. A battery pack with a shock absorbing system for insertion into a handle of a handheld scanner, the battery pack comprising:
    a battery cell and a cell gauge printed circuit board connected together;
    a shock absorbing material disposed around the battery cell and the cell gauge printed circuit board, the shock absorbing material comprising:
        a cylindrical portion encircling a cylindrical part of the battery cell functioning as a first shock absorber,
        a bottom portion that covers covering a bottom end of the battery cell and functioning as a second shock absorber,
        a top portion that covers substantially a top end of the battery cell and functioning as a third shock absorber, and
        an enclosing portion that surrounds the cell gauge printed circuit board and functioning as a fourth shock absorber;
    the cylindrical portion, the bottom portion, the top portion, and the enclosing portion are placed together;
    the shock absorbing material positioned inside a plastic enclosure with a cap; and
    the plastic enclosure constructed of a single uniform piece of material having no ultrasonic welding;
    a set of brushes that position a hook inside a shell, the hook rotates around a hinged axis; and
    a button fleeting mounted on the hook, wherein the button and the hook are coupled together and allow a rotation of the hook and a translational motion of the button.

2. The battery pack of claim 1, wherein the cap is a metal cap.

3. The battery pack of claim 1, further comprising the battery pack operates in a handle of a handheld scanner.

4. The battery pack of claim 3, wherein the plastic enclosure containing the battery cell and cell gauge printed circuit board is positioned with an inner gasket and an outer gasket to assist in damping the force when the battery pack receives a physical impact.

5. The battery pack of claim 4, wherein the inner gasket and the outer gasket are made of silicone rubber.

6. The battery pack of claim 5, wherein the plastic enclosure containing the battery cell and cell gauge printed circuited board are seated in a coupler that forms an end of a handheld scanner.

7. The battery pack of claim 6, wherein the coupler has a locking and unlocking mechanism to lock or unlock the battery pack to or from the handheld scanner.

8. The battery pack of claim 7, wherein the coupler has an air bumping system in a front part to receive an impact.

9. A battery pack with a shock absorbing system for damping a force, comprising:
    a battery cell and a cell gauge printed circuit board connected together;
    the battery cell and the cell gauge printed circuit board located in a shock absorbing material;
    the shock absorbing material has a cylindrical portion encircling a cylindrical part of the battery cell, a bottom portion that covers a bottom end of the battery cell, and a top portion that covers substantially a top end of the battery cell, and an enclosing portion that surrounds the cell gauge printed circuit board;
    the cylindrical portion functions as a first shock absorber;
    the bottom portion functions as a second shock absorber;
    the top portion functions as a third shock absorber;
    the enclosing portion has a sub-piece that functions as a fourth shock absorber;
    the cylindrical portion, the bottom portion, the top portion, and the enclosing portion are placed together;
    the shock absorbing material positioned inside a plastic enclosure with a cap;
    the plastic enclosure constructed of a single uniform piece of material having no ultrasonic welding,
    a set of bushes that position a hook inside a shell;
    the hook rotates around a hinged axis;
    a button is fleeting mounted on the hook, wherein the button and the hook are coupled together and allow a rotation of the hook and a translational motion of the button, and wherein the translational motion of the button means the button moves with a trajectory in a line and does not rotate;
    when the battery pack is inserted into a handheld scanner, an extended component connected to the handheld scanner pushes against the hook, wherein the hook rotates and the button moves down in the translational motion, and wherein the extended component becomes engaged;
    when the extended component is engaged, the hook locks the battery pack in a position; and
    when the battery pack is removed from the handheld scanner, the button is pressed down and the button moves in the translational motion to retreat into the shell, wherein the hook rotates and unlocks the battery pack from the position.

10. The battery pack of claim 9, further comprising a chock that is inserted between the hook and the shell that prevents release of the battery pack due to a shock or impact.

11. The battery pack of claim 10, wherein the chock prohibits rotation of the hook.

12. The battery pack of claim 11, further comprising an actuator introduced below the shell to simplify a rotation of the chock.

13. The battery pack of claim 12, further comprising a spring pushes the actuator towards a bottom of the shell to prohibit rotation of the chock.

14. The battery pack of claim 13, further comprising the actuator is pushed and rotated to rotate the chock.

15. The battery pack of claim 9, when the battery pack is inserted into the handheld scanner, at least one spring is extended to a rest position allowing the battery pack to stay in a locked position.

16. The battery pack of claim 9, when the battery pack is removed from the handheld scanner, the at least one spring is compressed to a compressed position allowing the battery pack to be removed.

17. The battery pack of claim 1, wherein the bottom portion and the top portion each have a thickness than the cylindrical portion of the shock absorbing material.

18. The battery pack of claim 1, wherein the shock absorbing material is an elastomeric material.

19. A handheld scanner including a battery pack, comprising:
    a battery pack including:
        a battery cell and a cell gauge printed circuit board connected together;
        a set of bushes that position a hook inside a shell, the hook configured to rotate around a hinged axis; and
        a button fleeting mounted on the hook, wherein the button and the hook are coupled together and allow a rotation of the hook and a translational motion of the button that moves with a trajectory in a line and does not rotate,
    wherein:
        when the battery pack is inserted into the handheld scanner, an extended component connected to the handheld scanner pushes against the hook, wherein the hook rotates and the button moves down in the translational motion, and wherein the extended component becomes engaged;
        when the extended component is engaged, the hook locks the battery pack in a position; and
        when the battery pack is removed from the handheld scanner, the button is pressed down and the button moves in the translational motion to retreat into the shell, wherein the hook rotates and unlocks the battery pack from the position.

20. The handheld scanner of claim 19, wherein the battery pack further comprises a shock absorbing material disposed around the battery cell and the cell gauge printed circuit board to form a survival cell for the battery cell and the cell gauge printed circuit board.

* * * * *